Aug. 6, 1968    T. A. STOTEN    3,395,579
APPARATUS TO ENSURE ACCURATE WORKING OF METERS
AT LOW FLOW RATES
Filed Dec. 2, 1965                                    2 Sheets-Sheet 1

INVENTOR
TERENCE A. STOTEN

Edmund M. Jaskiewicz
ATTORNEY

Aug. 6, 1968  T. A. STOTEN  3,395,579
APPARATUS TO ENSURE ACCURATE WORKING OF METERS
AT LOW FLOW RATES
Filed Dec. 2, 1965   2 Sheets-Sheet 2
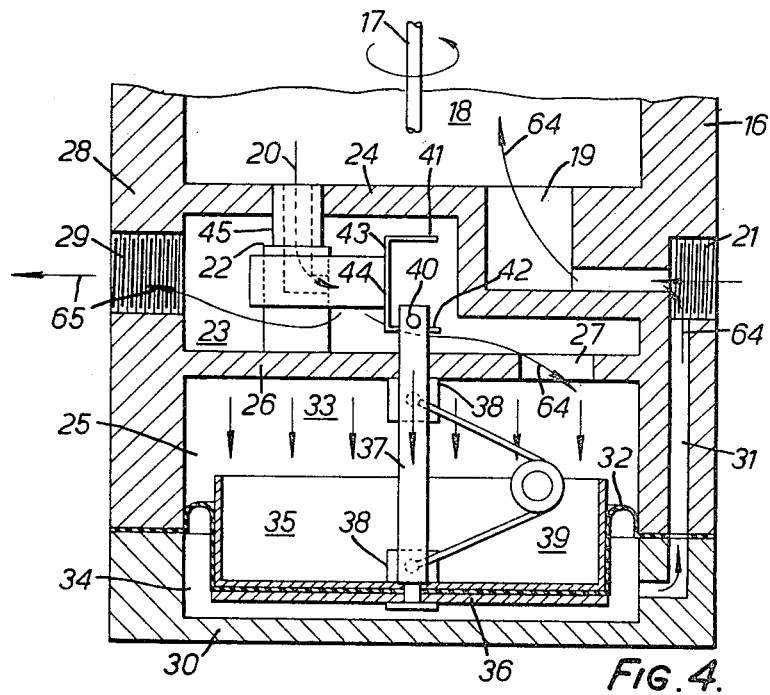
FIG. 4.
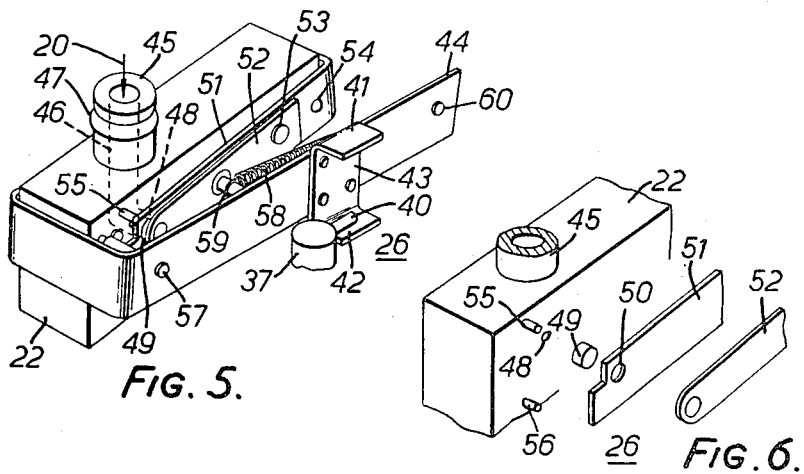
FIG. 5.
FIG. 6.
INVENTOR
TERENCE A. STOTEN
Edmund M. Jaskiewicz
ATTORNEY

United States Patent Office 3,395,579
Patented Aug. 6, 1968

3,395,579
APPARATUS TO ENSURE ACCURATE WORKING
OF METERS AT LOW FLOW RATES
Terence A. Stoten, Barton, England, assignor to
George Kent Limited
Filed Dec. 2, 1965, Ser. No. 511,147
Claims priority, application Great Britain, Dec. 8, 1964,
49,986/64, Patent 1,064,396
16 Claims. (Cl. 73—199)

ABSTRACT OF THE DISCLOSURE

An apparatus for controlling the flow of fluid through a flow meter so that accurate measurements may be obtained at low rates and comprising a cylindrical housing having a movable wall therein to define two chambers. One chamber is connected to the fluid line upstream of the flow meter and the other chamber to the fluid line downstream of the flow meter. A valve having positive open and closed positions is in the fluid line and is operatively connected to the movable wall so that the valve is opened or closed in response to predetermined positions of the movable wall.

---

This invention relates to apparatus for use with fluid meters to ensure accurate working of the meter at very low flow rates. Apparatus to which the application relates acts as a storage chamber, supply chamber and pump so that during low flow demand periods the flow meter registers intermittently but at a predetermined high flow rate. All flow meters only maintain their specified accuracy between qualified limiting flow rates and this type of apparatus is designed to overcome the limitations at the lower flow rate limit below which a meter would underregister or possibly stall completely and thus over a period of time pass a considerable amount of fluid without registering. Such low flows result from, for example, dripping taps and pilot burners. The principle upon which this type of apparatus operates depends upon allowing fluid to flow through the meter concerned at a high rate for short periods when only low flows are operating and this is achieved by arranging a valve which controls the flow through the meter and storage chamber downstream of the meter so that when the valve is opened, the storage chamber can be filled. When it is filled, the valve is closed and the low flow is taken from the filled storage. When the storage chamber approaches a low level the valve is again opened so that it is refilled but the fluid passing through the meter and into the storage chamber thus passes at a predetermined high flow rate so that the meter is accurately operated. It will be appreciated that as the valve controlling the flow is closed immediately the chamber is filled, there is no flow through the meter apart from the predetermined high flow, all the low flow being taken from the storage chamber.

According to the present invention therefor apparatus for use with a fluid meter includes an expandable fluid storage chamber at least one wall of which can move in relation to one of its other walls, and adapted for connection into a fluid line downstream of the meter, a valve having an operating mechanism which causes it to positively open or close which can be connected to control the flow of fluid through the meter, and means actuated by the movable wall which cause operation of the valve operating mechanism when the wall reaches predetermined spaced positions, so that the valve opens and closes in such a manner that the fluid passes through the meter in gulps.

Thus, the apparatus can be connected for use with a fluid meter so that when the expandable fluid storage chamber approaches or reaches its maximum dimensions, the control valve is closed. With a low flow rate, fluid will now be tapped from the storage chamber. When the expandable fluid storage chamber approaches or reaches a predetermined minimum volume, the movable wall will cause operation of the valve operating mechanism and the valve will be positively opened and fluid will be able to flow at a predetermined high flow rate through the meter to refill the expandable fluid storage chamber. Such a high flow rate will thus constitute a gulp. When the flow rate to the process increases above the gulp flow rate the pressure drop across the valve and meter will be sufficient to keep the movable wall fully depressed even when the valve is open. The valve will thus remain open and fluid will continue to pass directly through the meter until such time as the flow rate reduces sufficiently to allow the movable wall to return and thus close the valve.

In a preferred arrangement the valve is adapted for connection on the downstream side of the meter but upstream of the connection to the expandable storage chamber.

The apparatus may include a chamber having a movable dividing wall, the variable volume chamber on one side of this wall constituting the expandable fluid storage chamber, and the other variable volume chamber providing a balancing chamber which can be connected to the fluid line upstream of the meter. With this arrangement the load on the dividing wall can be balanced so that the only pressure difference is light, as compared to that which would prevail if the wall merely had the flow line pressure on one side.

Preferably the dividing wall is in the form of a diaphragm and means may be included for biasing the dividing wall towards a position in which the fluid storage chamber is at its maximum capacity. Such biasing means may include a torsion spring.

In a preferred arrangement the valve operates with a "snap" action and the valve operating mechanism may include a pivoted actuating arm which controls movement of a valve member through a biased "over-centre" action.

The invention also includes a meter provided with apparatus as set forth above, and it will be appreciated that such apparatus may be incorporated within the general meter casing.

The invention may be performed in various ways but one embodiment will now be described by way of example and with reference to the accompanying drawings in which:

FIGURE 3 and FIGURE 4 are cross sectional side elevations of a practical embodiment of the apparatus in position corresponding to FIGURES 1 and 2, FIGURE 5 is an isometric view of part of the valve mechanism, and, FIGURE 6 is an exploded view of part of the valve mechanism.

Figure 1:
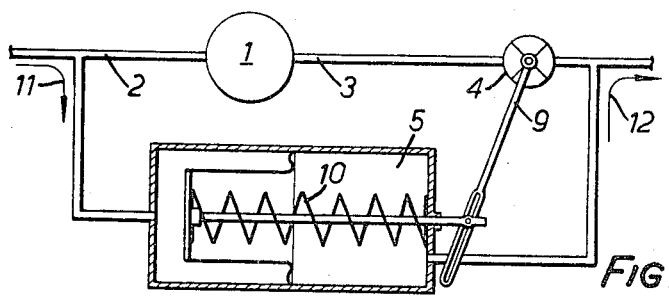
FIGURES 1 and 2 are diagrammatic views of the apparatus connected into a flow line, with the apparatus in alternative operating positions.
Figure 2:
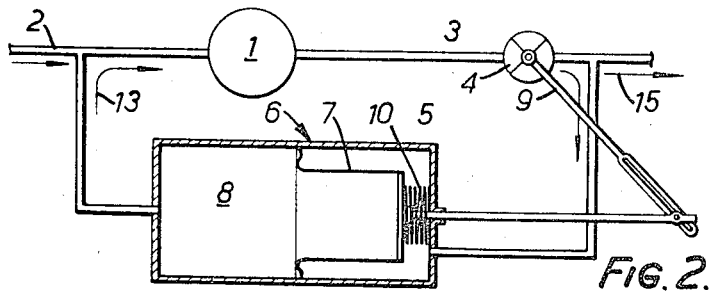

FIGURES 1 and 2 indicate the general principle upon which this apparatus works. The fluid meter is indicated with the reference numeral 1, the upstream part of the fuel line by reference numeral 2 and the downstream by reference numeral 3. A valve 4 is provided in the flow line downstream of the meter 1 and a variable volume chamber 5 is connected into the flow line downstream of the valve 4. The variable volume chamber 5 is provided in a cylinder 6 which is divided by a movable wall 7 which thus provides a balancing chamber 8 on the opposite side of the wall 7 to the variable volume chamber 5. The balancing chamber 8 is connected into the flow line upstream of the meter 1. The valve operating mechanism 9 is connected to the movable wall 7 and the wall is biased towards one position by means of a coil spring 10, the arrangement being such that when the spring 10 is extended the valve 4 is in its closed position, and the valve is arranged to be of the "snap action" type but to remain in a given state until its operating mechanism 9 has moved through its complete travel range. Although the valve is shown on the downstream side of the meter it can equally well be fitted on the upstream side if desired. FIGURE 1 shows the movable wall 7 at the start of its stroke with the valve 4 closed. In this state fluid is flowing into the balancing chamber 8 as shown by the arrow 11, and out of the variable volume chamber 5 as indicated by the arrow 12, at a low rate. The pressure drop across the variable volume chamber is compressing it against the action of the spring 10 and fluid continues to flow into and out of the respective chambers until the movable wall 7 is forced to the opposite end of the chamber and the spring becomes fully compressed as shown in FIGURE 2. At this point the valve apparatus 9, having traversed to the full extent of its movement will trip the valve 4 open and the movable wall 7 will start its return stroke under the action of the spring 10, forcing fluid at a high rate from the balancing chamber 8, through the meter 1 and into the downstream chamber 5 as indicated by the arrows 13 and 14. A low rate fluid flow indicated by the arrow 15 will continue to be bled off to the apparatus or process. The spring 10 is rated so that the high rate of fluid flow is sufficient to operate the meter on a part of its accuracy curve which is within the desired metering limits. Fluid will continue to flow through the meter until the movable wall 7 has returned to the position as shown in FIGURE 1 at which point, the valve will be snapped to its closed position and the cycle restarted. It will be appreciated that the variable volume chamber 5 acts as a storage chamber for fluid but that the fluid passes through the meter in gulps which can be registered.

Figure 3:
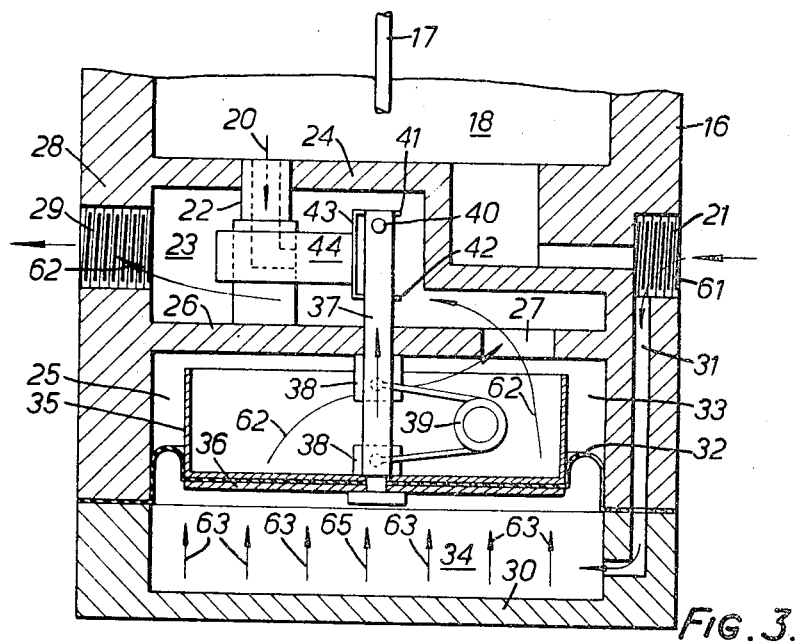

FIGURES 3 and 4 show a practical arrangement of the mechanism which can be fitted to the bottom of a meter within its general outer casing 16, the meter spindle being indicated diagrammatically at 17 in the drawings. The meter measuring chamber 18 is provided at its lower end with inlet and outlet ports 19, 20 the inlet port 19 being connected through a boring in the meter casing to a tapped inlet opening 21 and the outlet port 20 being connected to a valve block 22, to be described. The valve block 22 is carried in a valve chamber 23 disposed below the lower wall 24 of the measuring chamber 18 and this valve chamber 23 is immediately above a chamber in the form of a cylinder 25 formed in the casing 16 and from which it is divided by a wall 26. An opening 27 extends through the dividing wall 26 into the cylinder so that there is a direct communication between the valve chamber 23 and the cylinder, and the side wall 28 of the valve chamber is provided with an outlet opening 29 which is screw threaded in a similar manner as that of the inlet opening 21 for direct connection to the line with which the meter is to be used.

The end of the cylinder 25 remote from the dividing wall 26 is closed by a flanged end cover 30, the flanges of which co-operate with the side walls of the general casing 16 to continue the length of the cylinder and a passage 31 is provided in the side wall and also in the flange so that there is an opening into the cylinder 25 adjacent its closed end. The other end of the passage 31 opens into the inlet passage 19 which is connected to the measuring chamber 18. A diaphragm 32 is clamped between the end cover 30 and the main wall of the meter casing 16 and extends across the cylinder 25 to divide it into two chambers, the upper chamber which communicates with the valve chamber 23, and which is referred to herein as the expandable fluid storage chamber 33, and the lower chamber which is referred to herein as the balancing chamber 34.

A cup shaped piston member 35 is connected to the diaphragm 32 within the fluid storage chamber, and a flat plate 36 is connected to the diaphragm on its other side so that for a substantial cross-section area of the chamber the diaphragm is supported. An annulus is thus formed between the cup shaped member 35 and the cylinder wall and in this the diaphragm 32 is free to move. Extending from the centre of the diaphragm and connected rigidly with the plate 36 and the cup shaped member 35 is an operating rod 37 which extends through an opening in the dividing wall 26 and into the valve chamber 23. A pair of annular locating rings 38 extend around the operating rod 37 and can slide thereon within the fluid storage chamber 33, and these rings 38 are used to locate a pair of axially aligned hair-pin torsion springs 39 of the multi-coil type which act to bias the cup-shaped member 35, and thus the diaphragm 32 towards the lower end of the cylinder 25. The upper end of the operating rod 37 within the valve chamber 23, carries an operating pin 40 which extends into the gap between two arms 41, 42 of a yoke shaped member 43 which is connected to the actuating arm 44 of the valve operating mechanism.

The valve is shown in detail in FIGURES 5 and 6 and comprises a valve block 22 from which extends a stem 45 having a bore 46 which communicates with the metering chamber 18 of the meter. This stem 45 is sealed into the metering chamber by means of an O ring 47 fitted in the end of the stem. The valve block 22 is bored so that a valve port 48 is formed which is at right angles to the entry port 20 into the valve block from the metering chamber 18. It will be appreciated that the metering chamber 18 can communicate with the valve chamber 23 through the bore 46 in the valve block and the valve stem. The valve port 48 is closed by a valve pad 49 which is in the form of a cylindrical block carried freely in a bore 50 in a valve arm 51 as shown in FIGURE 6. A portion of the valve pad 49 extends on each side of the valve arm 51, and the side displaced from the valve block is acted upon by a leaf spring 52 which is rivetted to the valve arm 51 at 53. Thus, the valve pad 49 is biased towards the valve block 22. The valve arm 51 is pivoted at 54 to the valve block 22 so that the valve pad 49 can slide across the surface of the side of the valve block, and forms in effect a slide valve. The rotational movement of the valve arm 51 is limited by stops 55, 56 and when the valve arm is against the upper stop, the valve port 48 is open. The valve port 48 is closed when the valve arm is against the lower stop 56. The actuating arm 44 is also pivoted to the valve block 22 but at a point 57 remote from the pivot point 54 of the valve arm 51, the valve arm extending from its pivot 54 towards the actuating arm 44, and the actuating arm extending on the side of the valve arm remote from the valve block 22, to a point beyond the pivot point 54 of the valve arm. Attached to the valve arm 51 is a spring 58, the other end of which is attached to the actuating arm, the point of attachment 59 to the valve arm 51 being between the pivot points 54 and 57 of the respective arms, and the point of attachment 60 to the actuating arm, being beyond the pivot point 54 of the valve arm 51.

The yoke shaped member 43, referred to above is securely fastened to the actuating arm 44 and the pin 40 on the operating rod 37 extends between the two arms 41, 42 of the yoke so that when the diaphragm 32 is adjacent to the lower end of the cylinder 25, and the fluid storage chamber 33 is at its maximum capacity, the actuating arm 44 is at its lowermost position. When the actuating arm reaches a predetermined position where the point of attachment 60 to the tension spring 58 is below a line passing through the points 59 and 54 of the valve arm the spring is at its maximum length. Any further downward movement of the actuating arm 44 will tend to cause the spring 58 to shorten if possible and once the friction of the valve pad 49 has been overcome will cause the valve arm 51 to be "snapped" towards its lower position to close the valve port 48. As the diaphragm 32 approaches the upper end of the chamber 33, the operating rod 37 contacts the upper arm 41 of the yoke 43 which causes the actuating arm 44 to move upwardly until it reaches a position where the point of attachment 60 to the tension spring is above the pivot point 54 of the valve arm 51 and the spring 58 is at its maximum length. At this point, any further movement will cause the spring 58 to shorten if possible and will thus cause the valve arm 51 to be "snapped" to its upper position, thus opening the valve port 48.

The line of maximum spring length passes through the spring connection points on the arms and the valve arm pivot point but not the actuating arm pivot point when the valve is open or closed. Thus, when the valve is closed, this maximum extension spring line, when the actuating arm is moving upwardly will pass beneath the actuating arm pivot point, and when the valve is open and the spring is approaching its maximum extension and the actuating arm moving downwardly will pass above the actuating arm pivot point. With this arrangement the four points cannot all be in line at the same instant and therefore the mechanism cannot lock in one position.

The lost motion created by the movement of the operating pin 40 on the operating rod 37 between the arms 41, 42 of the yoke 43 is sufficient to accommodate appropriate movement of the diaphragm 32 in the cylinder 25 so that the valve 48, 49 is only operated when the diaphragm, which constitutes a dividing wall in the chamber approaches its upper and lower positions.

It will be appreciated that the valve 48, 49 is operated regardless of the pressures existing at various parts of the apparatus, that is, operation of the mechanism is entirely dependent upon the position of the diaphragm 32 and the valve arm 51 under the biasing action of the spring 58 will always snap into position against one of the stops 55, 56 when the actuating arm 44 passes beyond the centre position, in which position the valve arm is in a state of unstable equilibrium and further movement will cause operation of the valve.

In operation the apparatus works as follow: when the valve 48, 49 is closed, as shown in FIGURE 3, fluid flows into the balancing chamber as shown by arrows 61 and out of the fluid storage chamber as shown by arrows 62 at a low rate. Such flow might be caused, for example, by a dripping tap. At this stage the pressure drop across the diaphragm 32 is compressing it against the action of the spring as indicated by arrows 63 and fluid continues to flow into and out of the respective chambers until the diaphragm 32 is forced to the opposite end of the chamber and the spring 39 becomes fully compressed which position it has reached in FIGURE 3. At this position the operating rod 37 having traversed to the fullest extent of its movement, will cause the operating pin 40 to engage the upper arm 41 of the yoke 43 and trip the valve 48, 49 open. The diaphragm 32 will now start its return stroke under the action of the spring 39 forcing fluid at a high rate from the balancing chamber 34 as shown by arrows 64 through the passage 31 in the wall of the cylinder, into the inlet 19 to the metering chamber 18, through the meter and the valve 48, 49 into the valve chamber 23 and thus into the expandable storage chamber 33. The low rate fluid flow as shown by arrows 65 will continue to be bled off from the valve chamber 23 through the outlet opening 29 in the meter wall.

The torsion spring 58 is rated so that the high rate fluid flow is sufficient to operate the meter on a part of its accuracy curve which is within the desired metering limits, and the diaphragm 32 thus acts as a pump. Fluid continues to flow through the meter at this high rate, until the diaphragm has moved down the cylinder to its lowermost position as shown in FIGURE 4 at which point the operating pin 40 will engage the lower arm 42 of the yoke 43 to cause the valve 48, 49 to be "snapped" to its closed position. The cycle will now repeat itself, fluid being drawn off from the expandable fluid storage chamber 35, and the diaphragm 32 rising until once again the valve 48, 49 is operated to its open position so that the meter again measures a gulp of fluid.

The torsion spring 39 in the expandable fluid storage chamber is designed so that it works over a very small part of its total range and is therefore substantially linear. Thus, the force of the diaphragm 32 is also substantially linear throughout its stroke. This arrangement is particularly advantageous in that when the diaphragm is driving fluid through the meter, the pressure drop across the meter and, therefore the flow rate through it will be substantially constant. This ensures that the "gulps" are measured at a particular point on the meter accuracy curve. The disadvantage of using a coil spring in this kind of arrangement is that its decreasing thrust results in a decrease in the gulp flow rate which may well drop below the lower flow rate limit of the flow meter. A coil spring which gave the required linearity would be too long to permit the design of a compact unit suitable for fitting to the base of a meter. It is however possible to design a torsion spring so that "gulps" are metered to an accuracy which is well within the spread of the normal working range.

The spring rate of the torsion spring 39 is in effect slightly increased just prior to the opening of the valve by the effective spring rate of the valve mechanism. This causes a slight increase in the pressure drop across the meter just before the "gulp" is admitted to the measuring chamber and is particularly advantageous since it provides an initial surge to assist in overcoming the inertia of the meter moving parts and the hydraulic system.

So far the mechanism has only been considered when the pressure drop across the meter 1 and the valve 48, 49 is low that is, the fluid flow to the process, for example, the dripping tap is low. When however, the process demand increases, the pressure drop across the meter increases until, with the value 48, 49 open, it is sufficient to keep the diaphragm spring 39 fully compressed. This flow will always be in excess of that of the "gulp" and will therefore be on a favourable part of the meter accuracy curve. Thus, the meter will be registering as for normal flows and will continue to do so until such time as the pressure drop reduces sufficiently to allow the spring 39 to return the diaphragm and thus close the valve.

One particular advantage of this kind of apparatus is that the design specification for the meter can be based on the high end of the flow rate range without the need to consider the low end where the requirements would otherwise impose excessive pressure loss characteristics of the higher flows.

What I claim is:

1. In an apparatus for controlling the flow through a flow meter so that accurate measurements may be obtained at low flow rates, an enclosed housing having a movable wall therein to define a balancing chamber on one side of the wall and a variable volume chamber on the other side of the wall, first conduit means connecting said balancing chamber to a fluid line upstream of a flow meter, second conduit means connecting said variable volume chamber to the fluid line downstream of the flow meter, a valve in said fluid line between said conduit connections to control the flow of fluid through the flow meter and having positive open and closed positions, and means operatively connecting said movable wall and said valve for opening and closing said valve in response to predetermined positions of said movable wall so that the fluid will flow through the meter in gulps.

2. Apparatus as claimed in claim 1 in which the valve is connected on the downstream side of the meter but upstream of the conduit connection to the variable volume chamber.

3. Apparatus as claimed in claim 1 in which the movable wall comprises a diaphragm.

4. Apparatus as claimed in claim 1 including means for biasing the movable wall towards a position in which the variable volume chamber is at its maximum capacity.

5. Apparatus as claimed in claim 4 in which the biasing means comprises a torsion spring.

6. Apparatus as claimed in claim 1 in which the means operated by the movable wall includes a lost motion mechanism.

7. Apparatus as claimed in claim 6 in which the means comprises an operating rod extending from said wall and movable therewith, a yoke connected to the valve actuating mechanism, said rod carrying means engaging spaced portions of the yoke so that the valve mechanism is tripped when the wall reaches a predetermined position near the end of its movement in opposite directions.

8. Apparatus as claimed in claim 1 with said valve being of the "snap" action type and having a valve member movable between open and closed positions.

9. Apparatus as claimed in claim 8 in which the valve actuating mechanism includes a pivoted actuating arm which controls movement of a valve member through a biased past dead center action.

10. Apparatus as claimed in claim 9 and comprising a pivoted valve arm carrying said valve member and pivoted at a point displaced from the pivot point of the actuating arm, a tension spring interconnecting said two arms, the points of the spring to the respective arms being such that the valve arm is not caused to move about its pivot point until the actuating arm has extended the spring to its maximum length.

11. Apparatus as claimed in claim 10 in which the valve arm extends in a direction towards the pivot point on the actuating arm, and the actuating arm extends in a direction towards and beyond the pivot point on the valve arm.

12. Apparatus as claimed in claim 11 in which the tension spring is connected to the valve arm at a point between the valve arm and actuating arm pivot points and is connected to the actuating arm at a point beyond the valve arm pivot point, the line of maximum spring length passing through the spring connection points and the valve arm pivot point but not the actuating arm pivot point when the valve is in the open and closed positions.

13. Apparatus as claimed in claim 12 including stop means for limiting rotary movement of the valve arm about its pivot.

14. Apparatus as claimed in claim 10 in which the valve is a slide valve and has a valve block.

15. Apparatus as claimed in claim 14 in which the valve member comprises a pad, and means for biasing said pad towards said valve block.

16. Apparatus as claimed in claim 15 in which the pad is carried by the valve arm, and a leaf spring carried by said valve arm and biasing said pad towards the valve block.

References Cited

UNITED STATES PATENTS

| | | | |
|---|---|---|---|
| 1,808,209 | 6/1931 | Earl | 73—198 |
| 2,049,642 | 8/1936 | Earl | 73—198 |
| 2,095,485 | 10/1937 | Bassett | 73—198 |
| 2,116,592 | 5/1938 | Bassett | 73—198 |
| 3,145,565 | 8/1964 | Smith et al. | 73—200 |

FOREIGN PATENTS 228,226  11/1910  Germany.

JAMES J. GILL, *Primary Examiner.*

ROBERT S. SALZMAN, *Assistant Examiner.*